United States Patent [19]
Iwata et al.

[11] Patent Number: 5,872,903
[45] Date of Patent: *Feb. 16, 1999

[54] INTEGRATED CIRCUIT DEVICE WITH A MEMORY THAT PRESERVES ITS CONTENT INDEPENDENTLY OF A SYNCHRONIZING SIGNAL WHEN GIVEN A SELF-CONTROL REQUEST

[75] Inventors: Shunichi Iwata; Mitsugu Satou, both of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 805,350

[22] Filed: Feb. 24, 1997

[30] Foreign Application Priority Data

Oct. 29, 1996 [JP] Japan ................ 8-286603

[51] Int. Cl.$^6$ ................................... G06F 15/16
[52] U.S. Cl. .............................. 395/182.1; 395/551
[58] Field of Search ........................... 395/560, 551, 395/553, 559, 182.1

[56] References Cited

U.S. PATENT DOCUMENTS

| | | | |
|---|---|---|---|
| 5,233,698 | 8/1993 | Zuk | 395/560 |
| 5,247,655 | 9/1993 | Khan et al. | 711/106 |
| 5,295,258 | 3/1994 | Jewett | 395/182.1 |
| 5,297,276 | 3/1994 | Millar | 395/182.21 |
| 5,392,437 | 2/1995 | Matter | 395/750 |
| 5,437,021 | 7/1995 | David | 395/550 |
| 5,465,367 | 11/1995 | Reddy et al. | 365/222 |
| 5,710,910 | 1/1998 | Kehl | 395/551 |

FOREIGN PATENT DOCUMENTS

| | | |
|---|---|---|
| 62-145458 | 6/1987 | Japan . |
| 62-126018 | 5/1988 | Japan . |

*Primary Examiner*—Eric Coleman
*Attorney, Agent, or Firm*—Burns, Doane, Swecker & Mathis, LLP

[57] ABSTRACT

When a CPU (1) writes "10" into a register (RG) provided in a controller (5), an AND gate (10) receives a CPU clock mask signal (CMS1) having the logic of "0" by one of its input terminals and accordingly cuts off the supply of a clock signal CLK to the CPU (1). Then, the CPU (1) is suspended, thereby reducing power consumption of the CPU (1). To return out of this state, a user has only to input an interrupt request to the controller (5) through a terminal (T1). Receiving the request, the controller (5) outputs the CPU clock mask signal (CMS1) having the logic of "1" to one of the input terminals of the AND gate (10) so as to supply the CPU (1) with the clock signal (CLK) again. Upon restarting the supply of the clock signal (CLK), the CPU (1) starts an operation to implement the interrupt request. With this configuration, an integrated circuit device including a control circuit for controlling operations of a processing circuit and a memory circuit with excellent operability can be provided.

10 Claims, 6 Drawing Sheets

| | SET CONDITION | CLEAR CONDITION |
|---|---|---|
| CPU-SLEEP-MODE BIT bit 1 | RG WRITE SIGNAL and VALUE OF RG = "10" | CONDITION 1 |
| STANBY-MODE BIT bit 2 | RG WRITE SIGNAL and VALUE OF RG = "11" | CONDITION 2 |
| PURGE-REQUEST BIT bit 3 | 1 CYCLE AFTER SETTING OF STANBY-MODE BIT bit2 | PURGE IS COMPLETED |
| SELF-REFRESH-REQUEST BIT bit 4 | 1 CYCLE AFTER PURGE COMPLETION | |
| CLOCK-MASK-REQUEST BIT bit 5 | 1 CYCLE AFTER SETTING OF SELF-REFRESH-REQUEST BIT bit4 | CONDITION 2 |
| STANBY-REQUEST BIT bit 6 | 1 CYCLE AFTER SETTING OF CLOCK-MASK-REQUEST BIT bit5 | |

CONDITION 1: INTERRUPT REQUEST or INTERNAL WAKE-UP REQUEST WKUP or INTERNAL RESET REQUEST RST

CONDITION 2: INTERNAL WAKE-UP REQUEST WKUP or INTERNAL RESET REQUEST RST

FIG. 6
(BACKGROUND ART)

INTEGRATED CIRCUIT DEVICE WITH A MEMORY THAT PRESERVES ITS CONTENT INDEPENDENTLY OF A SYNCHRONIZING SIGNAL WHEN GIVEN A SELF-CONTROL REQUEST

BACKGROUND OF THE INVENTION

1. Field of the Invention

The present invention relates to an integrated circuit device including a memory circuit which needs to preserve its content, namely, a DRAM.

2. Description of the Background Art

Figure 6:
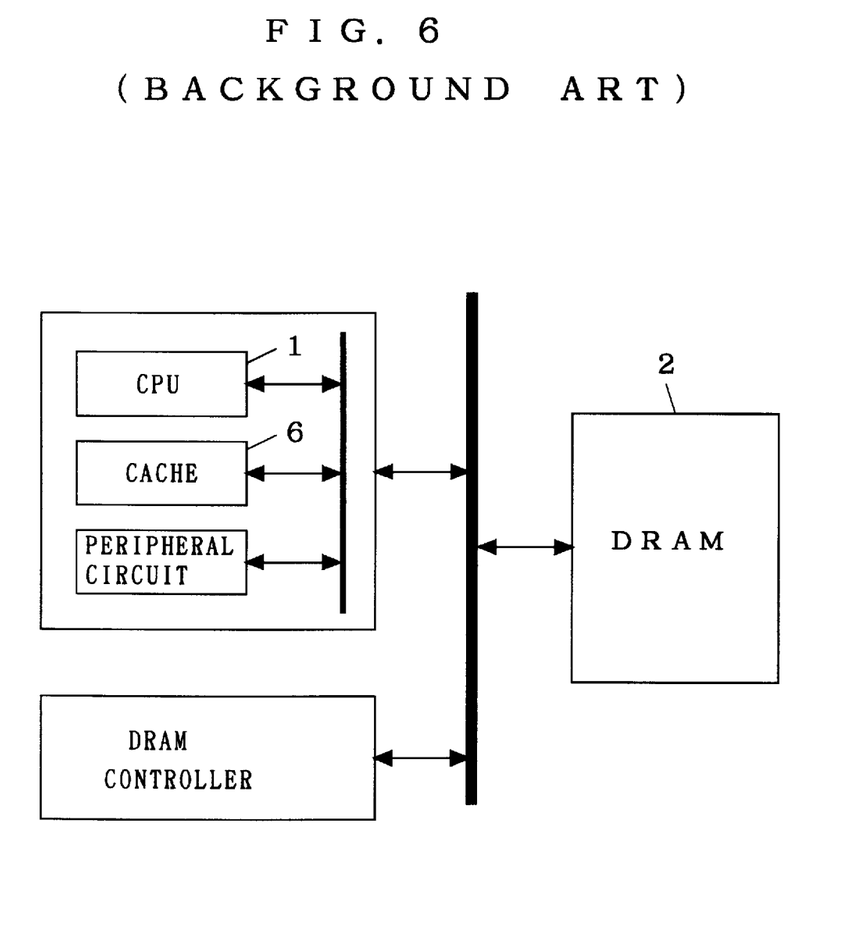
FIG. 6 is a circuit diagram showing a microcontroller in the background art.

FIG. 6 is a circuit diagram showing a background-art circuit including a microcontroller. In the background-art circuit configuration, the microcontroller including a CPU 1 and a DRAM 2 are not integrated on the same chip, and a combination of the CPU 1 and the DRAM 2 on different chips is adopted. A cache 6 is integrated on the same chip as the CPU 1, separately from the DRAM 2.

In this system configuration, to put the system into standby mode (in which both the CPU 1 and the DRAM 2 are suspended) for low power consumption, a user has to do the following procedures in sequence:

Procedure 1) to perform a purge of the cache 6;

Procedure 2) to perform a preservation of the content of the DRAM 2 with the DRAM 2 set into self-refresh mode by accessing a DRAM controller; and Procedure 3) to put the CPU 1 into suspend mode.

If an interrupt is requested between Procedure 2 and Procedure 3, for example, the CPU 1 remains in action while the DRAM 2 in the self-refresh mode can not be accessed. In this case, there is a possibility that an access request may be issued to the DRAM 2 by the CPU 1 resulting in no response. That should be avoided.

The user has to take some countermeasures, e.g., setting the circuit of FIG. 6 in the interrupt disabled mode during the above Procedures, to prevent the ordinary operation performed in an unfinished state of Procedures 1 to 3. Such countermeasures put a burden on the user and make an operability of the microcontroller worse.

SUMMARY OF THE INVENTION

The present invention is directed to an integrated circuit device. According to a first aspect of the present invention, the integrated circuit device comprises: a synchronizing signal generation circuit which stops generation of a synchronizing signal when given a standby request; a processing circuit for executing an instruction while receiving the synchronizing signal; a memory circuit which performs an operation while receiving the synchronizing signal and preserves its content independently when given a self-control request; and a control circuit for performing a sequential supply of the self-control request and the standby request when a write signal having a value of a first logic is given by the processing circuit.

According to a second aspect of the present invention, the integrated circuit device of the first aspect further comprises a cache. In the integrated circuit device of the second aspect, the control circuit conducts a purge of the cache before the sequential supply of the self-control request and the standby request when the write signal having the value of the first logic is given by the processing circuit.

According to a third aspect of the present invention, in the integrated circuit device of the second aspect, the control circuit shuts out any interrupt request to be given thereto in the purge and the sequential supply.

According to a fourth aspect of the present invention, in the integrated circuit device of the first aspect, the control circuit selectively cuts off the synchronizing signal to be inputted to the processing circuit by generating an enable signal with a logic indicating "non-permission" when the write signal having a value of a second logic is given by the processing circuit.

With the configuration of the first aspect, the control circuit automatically controls the preservation of the content of the memory circuit and the suspension of the operation of the processing circuit to be performed in sequence. The user has only to make a simple operation, i.e., give the value of the first logic. The power consumption of the integrated circuit device after the sequential supply of said self-control request and said standby request is roughly equal to that needed for preserving the content of the memory circuit. Therefore, without user's inconvenience, reduction in power consumption is achieved and the integrated circuit device with excellent operability can be provided.

In the integrated circuit device of the second aspect, the control circuit, instead of the user, performs the purge operation when a cache is used to assist the memory circuit for faster operation of the integrated circuit device. That saves use's labor for the purge operation.

In the integrated circuit device of the third aspect, shutting out the interrupt request automatically avoids the state in which the processing circuit makes an access to the memory circuit resulting in no response. The user do not have to make an operation for shutting out the interrupt request which has been conventionally needed and is accordingly lightened of his burden.

In the integrated circuit device of the fourth aspect, the processing circuit which need not work can be selectively stopped when the whole integrated circuit device is used as a memory device. That selectively saves only unnecessary electric power to be consumed.

An object of the present invention is to provide an integrated circuit device which includes the control circuit for controlling operations of the processing circuit and the memory circuit, with excellent operability.

These and other objects, features, aspects and advantages of the present invention will become more apparent from the following detailed description of the present invention when taken in conjunction with the accompanying drawings.

DESCRIPTION OF THE PREFERRED EMBODIMENTS

Discussion will be presented on an integrated circuit of the preferred embodiment of the present invention. The integrated circuit includes a control circuit which sequentially applies a self-control request and a standby request to a memory circuit and a synchronizing signal generation circuit respectively so that the memory circuit may preserve its content and the synchronizing signal generation circuit may be suspended. Like constituent elements are given the same reference numbers as those of the background art.

Figure 1:
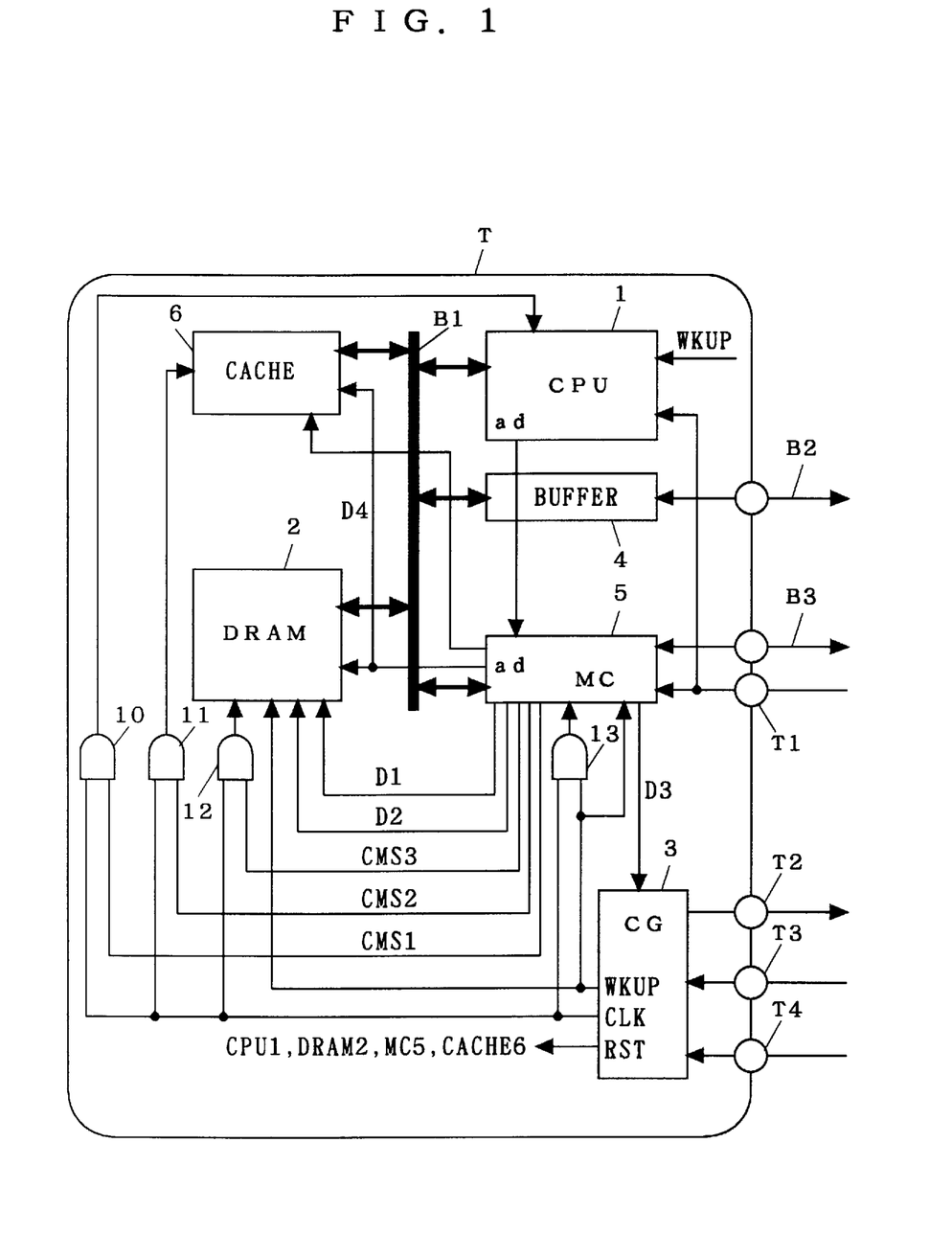
FIG. 1 is a circuit diagram of an exemplary configuration of a microcontroller in accordance with the present invention.

FIG. 1 is a circuit diagram of an exemplary configuration of a microcontroller in accordance with the present invention. As can be seen in FIG. 1, the CPU 1 and the DRAM 2 are integrated on a chip T. An outline of the circuit configuration of FIG. 1 will be discussed below.

The CPU 1, the DRAM 2, a buffer 4, a memory controller (MC) 5 and the cache 6 are connected to an internal data bus B1. The CPU 1 can make accesses to the DRAM 2 and the cache 6. The buffer 4 connects the internal data bus B1 and an external data bus B2, and the CPU 1 can make accesses to a device provided outside the chip T through the buffer 4. The device outside the chip T can also make accesses to the DRAM 2 and the cache 4. Since a peripheral circuit including a timer and the like as shown in FIG. 6 has no relation to the feature of the present invention, illustration in FIG. 1 and description associated therewith are omitted.

The memory controller 5 controls a bus access related to the above constituent elements. The control of the bus access is not discussed herein since it can be conducted in the conventional manner and is not an essential feature of the present invention. The memory controller 5 provides the DRAM 2 and the cache 6 with an address to control these circuits in a purge operation discussed later. The label "ad" is given to arrows associated with addresses, and it can be seen in FIG. 1 that the label is applied to the arrows from the memory controller 5 to the DRAM 2 and the cache 6.

Functions of the circuits integrated on the chip T will be discussed below. To start with, the CPU 1 is discussed. The CPU 1 operates in synchronization with a clock signal CLK outputted from a clock generator (CG) 3. Receiving an interrupt request, the CPU 1 suspends current instruction execution and starts execution of an instruction specified by a prescribed address after saving information including a program counter value and a status of the CPU 1 into a prescribed register. This procedure in response to the interrupt request will not be discussed since it is done in accordance with the conventional method and is not an essential feature of the present invention. The status of the CPU 1 is reset in response to an internal wake-up signal WKUP and an internal reset request RST supplied by the clock generator 3.

Now, functions of the DRAM 2 and the cache 6 will be discussed. The DRAM 2 and the cache 6 operate in synchronization with the clock signal CLK supplied by the clock generator 3. The DRAM 2 is provided with a self-refresh counter out of synchronization with the clock signal CLK to conduct its own refresh operation independently.

The mode of refreshing the DRAM 2 includes an auto-refresh mode and a self-refresh mode. In the auto-refresh mode, the DRAM 2 performs the refresh operation in response to an auto-refresh request D1 outputted from the memory controller 5.

On the other hand, in the self-refresh mode, the DRAM 2 performs the refresh operation with the self-refresh counter provided inside the DRAM 2 in response to the self-refresh request D2. In this mode, the DRAM 2 only performs the refresh operation, regardless of the signal to be inputted to the DRAM 2.

The cache 6 of the preferred embodiment adopts a copy back (write back) method in writing, and the following discussion will be made on this understanding. However, the writing manner of the cache 6 is not restricted to the copy back method, but may be the write through method. The DRAM 2 and the cache 6 are reset by the internal reset request RST.

Next, the clock generator 3 will be discussed. The clock generator 3 is a circuit to generate the clock signal CLK used inside the chip T on the basis of a clock input (not shown) which is externally applied. Receiving the standby request D3 from the memory controller 5, the clock generator 3 suspends clock generation and outputs a logic of "0" through a standby terminal T2 to clearly indicate that the circuit is in a standby state in the standby mode discussed later.

The clock generator 3 starts clock generation again when receives an external wake-up request through a terminal T3. After the clock generation becomes stable, the clock generator 3 provides the CPU 1, the DRAM 2 and the memory controller 5 with the internal wake-up request WKUP and outputs a logic of "1" through the standby terminal T2. Also when receives an external reset request through a terminal T4, the clock generator 3 starts the clock generation again and outputs the internal reset request RST in this case.

A difference between the internal wake-up request WKUP and the internal reset request RST will be discussed herein. The internal reset request RST is used to reset all of the circuits that receive it. On the other hand, of the circuits that receive the internal wake-up request WKUP, some are reset and the others are not reset.

The CPU 1 is reset in response to an input of the internal reset request RST or the internal wake-up request WKUP. After that, the CPU 1 starts execution of an instruction at an address specific to the internal reset request RST when receives the internal reset request RST and starts execution of an instruction at an address specific to the internal wake-up request WKUP when receives the internal wake-up request WKUP.

The DRAM 2 shifts from the self-refresh mode to the auto-refresh mode when receives the internal wake-up request WKUP and performs an operation, after being reset, in the auto-refresh mode.

Subsequent discussion will be presented on the memory controller 5. The memory controller 5 performs an operation in synchronization with the clock signal CLK outputted from the clock generator 3. The memory controller 5 controls both the bus access made inside the chip T and the bus access on signals to be transferred between the inside and outside of the chip T.

Figure 2:
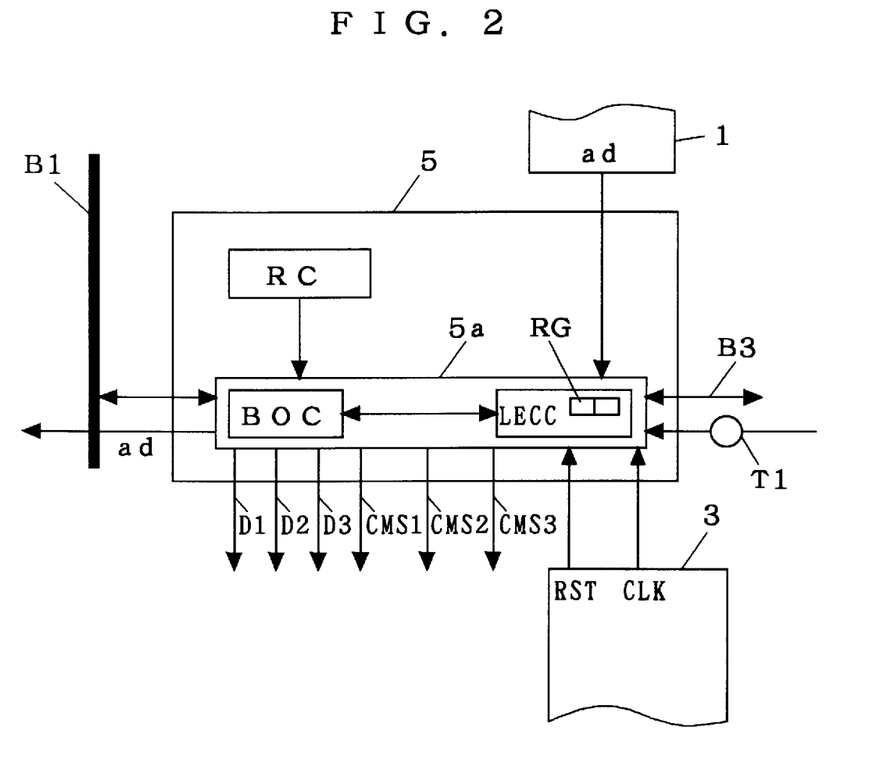
FIG. 2 is a circuit diagram of an exemplary configuration of a memory controller in accordance with the present invention.

FIG. 2 is a circuit diagram showing a configuration of the memory controller 5 of FIG. 1. The memory controller 5 includes an auto-refresh counter RC and an MC operation circuit 5a. The MC operation circuit 5a includes a bus operation control circuit BOC and a low electric-power consumption control circuit LECC. The low electric-power consumption control circuit LECC integrates a low electric-power consumption control register RG. Based on the above circuit configuration, the memory controller 5 performs a refresh of the DRAM 2 using the auto-refresh counter RC in a normal operation.

An outline of the function of the memory controller 5 is described herein, and detailed discussion thereof will be made later. The memory controller 5 performs a purge of the cache 6 with the bus operation control circuit BOC. The memory controller 5 is accessible by the CPU 1 through the internal data bus B1. Further, the memory controller 5 is reset by the internal reset request RST outputted from the clock generator 3.

The memory controller 5 outputs a CPU clock mask signal CMS1, a cache clock mask signal CMS2 and a DRAM clock mask signal CMS3, as shown in FIG. 1. The clock mask signal refers to an enable signal for the clock signal CLK. The memory controller 5 outputs the CPU clock mask signal CMS1 having a logic of "1" in response to any of the interrupt request inputted through the terminal T1, the internal reset request RST and the internal wake-up request WKUP.

Now, based on the functions of the circuits as above, an operation of the microcontroller of FIG. 1 will be discussed. In the integrated circuit of the present invention, the user has only to make a simple operation of changing the value stored in the low electric-power consumption control register RG integrated in the memory controller 5 to put the CPU 1 and the DRAM 2 into a low power-consumption mode.

The low power-consumption mode includes a CPU-sleep mode and a standby mode. The CPU-sleep mode refers to a mode of suspending only the CPU 1 by cutting off the clock signal CLK to be inputted to the CPU 1. On the other hand, the standby mode refers to a mode of completely suspending the clock generation of the clock generator 3 and only performing preservation of the content of the DRAM 2.

In the CPU-sleep mode, the power that would be consumed by the CPU 1 can be saved. Since only the CPU 1 is suspended, the DRAM 2 is accessible from the outside of the chip T. On the other hand, in the standby mode, since the clock generation is completely stopped, the whole power consumption of the chip T is roughly equal to that needed for the self-refresh operation of the DRAM 2 to preserve its content.

In the microcontroller of this preferred embodiment, when the value stored in the low electric-power consumption control register RG is "10", the circuit is put into the CPU-sleep mode and when "11", it is put into the standby mode. These are exemplary values, and values other than "10" or "11" may be naturally used. Furthermore, receiving the internal reset signal RST, the value of the low electric-power consumption control register RG is reset to "00".

First, an circuit operation to establish the CPU-sleep mode will be discussed and later the operation to establish the standby mode will be discussed. To put the circuit 1 into the CPU-sleep mode, the user has only to force the CPU 1 to execute an instruction to write "10" to the low electric-power consumption control register RG. For execution of this instruction, the CPU 1 outputs an address of the low electric-power consumption control register RG to the memory controller 5 and writes data of "10" into the low electric-power consumption control register RG through the internal data bus B1.

Then, the low electric-power consumption control circuit LECC of FIG. 2 recognizes the logic of "10" in the low electric-power consumption control register RG and changes the logic of the CPU clock mask signal CMS1 into "0" to be inputted to one of input terminals of an AND gate 10 of FIG. 1. The AND gate 10 is provided to perform a switch between on/off states on the input of the clock signal CLK to the CPU 1.

Since the AND gate 10 receives "0" by one of its input terminals, the clock signal CLK which is inputted to the other input terminal of the AND gate 10 is not propagated to the CPU 1. Accordingly, the CPU 1 stops and power consumption of the CPU 1 is suppressed.

To return the circuit out of the CPU-sleep mode, the user inputs an interrupt request to the memory controller 5 through the terminal T1. Receiving the request, the memory controller 5 changes the logic of the CPU clock mask signal CMS1 into "1" and input the signal CMS1 to the AND gate 10 to supply the CPU 1 with the clock signal CLK again. On restarting the supply of the clock signal CLK, the CPU 1 starts its operation to implement the interrupt request received through the terminal T1.

Next, the operation to establish the standby mode will be discussed below. First, the user has only to force the CPU 1 to execute an instruction to write "11" into the low electric-power consumption control register RG, thereby starting the following shift sequence.

Shift sequence 1: The memory controller 5 recognizes the logic of "11" and changes the logic of the CPU clock mask signal CMS1 into "0". That stops supplying the CPU 1 with the clock signal CLK, and accordingly the CPU 1 stops its operation. Thus, no more bus-access request is issued by the CPU 1. Any interrupt operation is not carried out even if an interrupt request is issued.

Shift sequence 2: The memory controller 5 issues a purge request D4 to perform a purge of the cache 6. Since the cache 6 adopts the copy back method, there is a possibility that the DRAM 2 has only old data and the cache 6 holds updated data. These data are called "dirty data". To invalidate the data filling the cache 6, the dirty data need to be written back to the DRAM 2. Then, the memory controller 5 performs the following processing of the dirty data.

Figure 3:
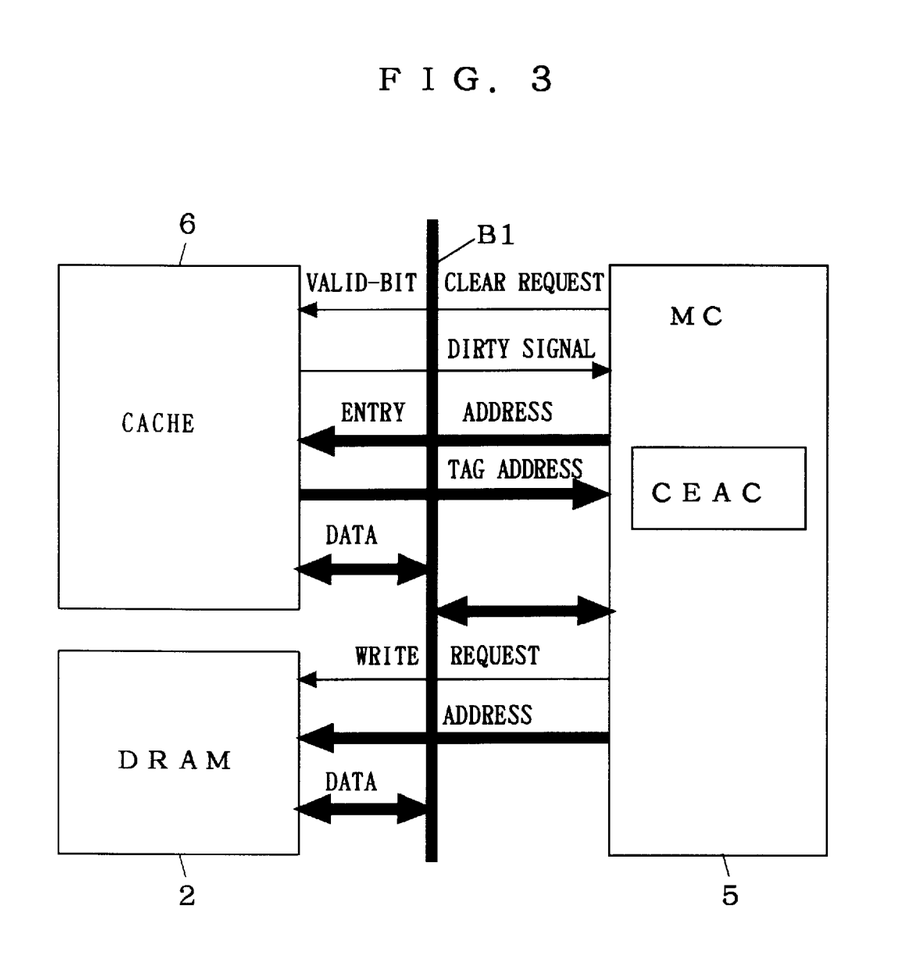
FIG. 3 is a circuit diagram showing an example of input/output of signals relating to a purge of a cache conducted by said microcontroller in accordance with the present invention.

FIG. 3 is a circuit diagram illustrating the transfer of signals in the purge operation. First, the memory controller 5 initializes its cache-entry address counter CEAC. The memory controller 5 outputs the entry address of the cache-entry address counter CEAC to the cache 6 for each entry. The "entry" refers to a register unit of a cache.

The cache 6 outputs a dirty signal and a tag address corresponding to the inputted entry address to the memory controller 5. The cache 6 also outputs data paired with the dirty signal and the tag address to the internal bus B1.

The dirty signal indicates whether the data outputted to the internal bus B1 should be written back or not, using the logic of "0" or "1". The memory controller 5 judges whether the data should be written back or not by the dirty signal. When judgment is that the data should be written back, the entry address and the tag address are coupled. The data held in the internal bus B1 is written into the DRAM 2 according to the address made by coupling the entry address and the tag address. The write of the data is performed by issue of a write request.

The write back of dirty data is completed by performing the above operation on all of the entries. After that, a valid bit is cleared by issue of a valid-bit clear request. The valid bit indicates whether valid data are held or not for each entry. The purge of the cache 6 is carried out through a sequence of circuit operations as above.

In a case of the cache 6 adopting the copy back method, the operation is done as discussed above. On the other hand, in a case of a cache adopting the write through method, it is not necessary to write back the dirty data. In this case, it is also needed that the purge operation to clear the valid bit of the cache 6 should be done by the memory controller 5.

Furthermore, in a case of a cache holding its content during the standby mode, it is not necessary to perform the purge of the cache.

Shift sequence 3: After the data stored in the cache are written back in Shift sequence 2, the memory controller 5 issues the self-refresh request D2 to put the DRAM 2 into the self-refresh mode. Through the operations in Shift sequences 2 and 3, it is ready to stop the supply of the clock signal CLK to the DRAM 2 and the cache 6.

Shift sequence 4: The memory controller 5 changes both the logics of the cache clock mask signal CMS2 and the DRAM clock mask signal CMS3 into "0". Accordingly, both AND gates 11 and 12 outputs stop and the supply of the clock signal CLK to the cache 6 and the DRAM 2 are cut off.

Shift sequence 5: The memory controller 5 issues the standby request D3 to the clock generator 3, as shown in FIG. 1. Receiving the standby request D3, the clock generator 3 stops clock generation and changes the logic of the standby terminal T2 into "0" to notify the outside of the chip T that the circuit is brought into the standby mode.

During Shift sequences 1 to 5, the memory controller 5 does not accept any other bus operation or interruption. Therefore, it is possible to avoid the state in which the CPU 1 is in operation while no access can be made to the DRAM 2.

Since the memory controller 5 automatically performs the purge operation in Shift sequence 2, the user does not have to conduct the conventional operation of purge, and is therefore lightened of burden.

Next, the return sequence from the standby mode will be discussed. The return sequence is started by the external wake-up request received through the terminal T3.

Return sequence 1: Receiving the external wake-up request, the clock generator 3 starts clock generation again. At this time, receiving the internal wake-up request WKUP of "0" by one of its input terminals, the AND gate 13 does not output the clock signal CLK to the memory controller 5. The clock generator 3 outputs a signal having the logic of "1" through the standby terminal T2 to notify the outside of the chip T that the circuit gets out of the standby mode.

Return sequence 2: After the clock generation is stabilized, the clock generator 3 changes the logic of the internal wake-up signal WKUP into "1". The memory controller 5 is thereby supplied with the clock signal CLK to start the normal operation. With the internal wake-up request WKUP changed into "1", the DRAM 2 shifts from the self-refresh mode to the auto-refresh mode.

Return sequence 3: The memory controller 5 changes all the logics of the CPU clock mask signal CMS1, the cache clock mask signal CMS2 and the DRAM clock mask signal CMS3 into "1" to supply the CPU 1, the DRAM 2 and the cache 6 with the clock signal CLK.

Return sequence 4: The CPU 1 performs a wake-up operation.

Based on the above circuit operation to establish the CPU-sleep mode and the standby mode, detailed discussion on a configuration of the memory controller 5 which is an essential feature of the present invention will be presented below.

Figure 4:
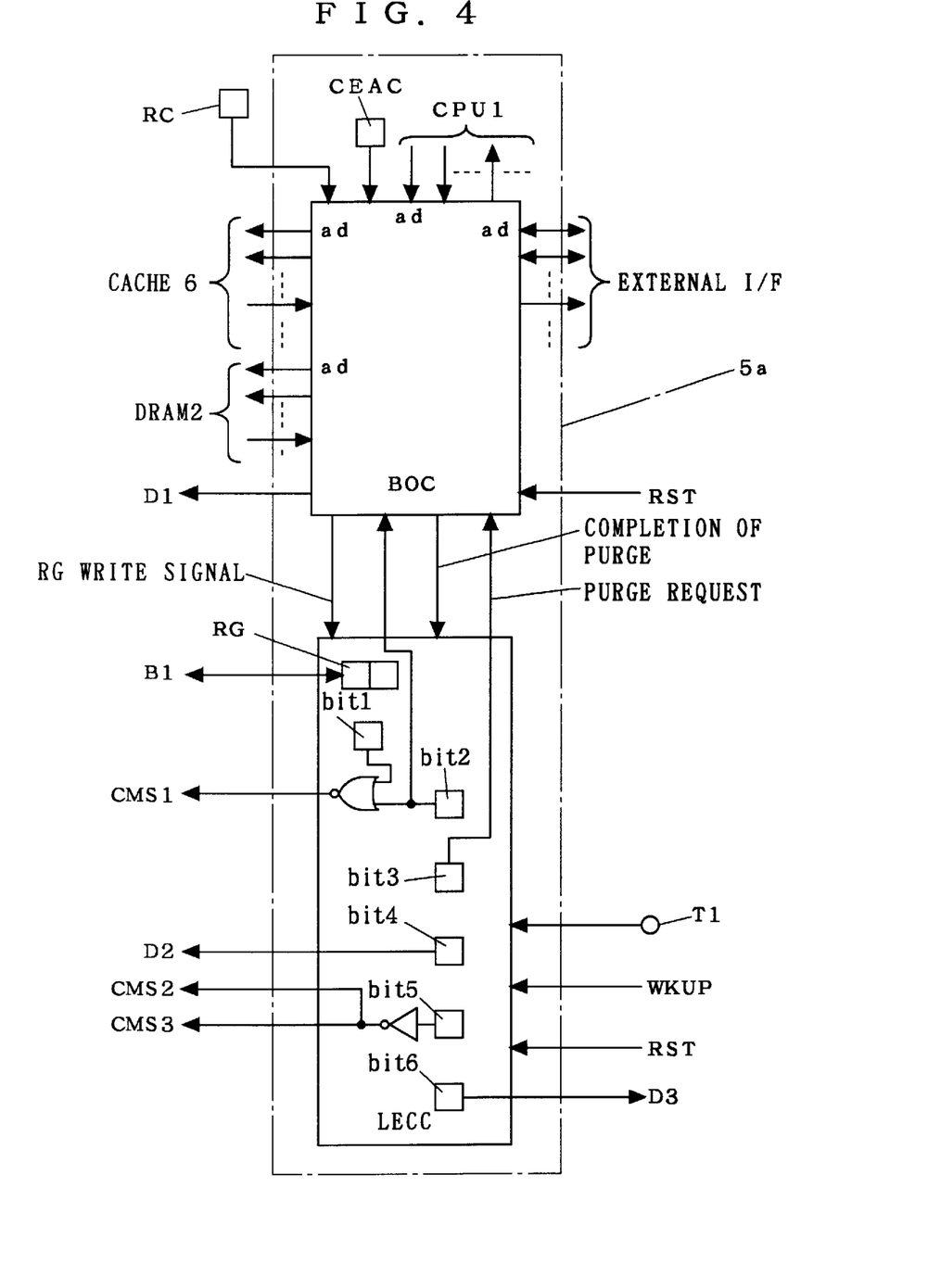
FIG. 4 is a circuit diagram showing the configuration of the memory controller of FIG. 2 in more detail.

FIG. 4 is a circuit diagram illustrating the configuration of the memory controller 5. The bus operation control circuit BOC receives/outputs control signals from/to the CPU 1, the DRAM 2, the cache 6 and an external interface (I/F) circuit to conduct input/output of addresses therebetween. The bus operation control circuit BOC outputs the auto-refresh request D1.

In the low electric-power consumption control circuit LECC, the value according to an RG write signal outputted from the bus operation control circuit BOC is written into the low electric-power consumption control register RG.

A signal indicating a NOR of a CPU-sleep-mode bit bit1 and a standby-mode bit bit2 which are provided in the low electric-power consumption control circuit LECC serves as the CPU clock mask signal CMS1. In other words, when "1" is set to at least one of the CPU-sleep mode bit bit1 and the standby mode bit bit2, the CPU clock mask signal CMS1 becomes "0" to cut off the supply of the clock signal CLK to the CPU 1. The logic of the standby-mode bit bit2 is outputted to the bus operation control circuit BOC, which serves as a direction to perform the operation for a shift to the standby mode.

The logic of a purge-request bit bit3 provided in the low electric-power consumption control circuit LECC is outputted to the bus operation control circuit BOC as a purge request as indicated by the arrows in FIG. 4. When the logic of purge request indicates "do", the bus operation control circuit BOC performs a sequence of purge operation on the cache 6, i.e., clearing the valid bit and writing the dirty data back. At termination of the purge operation, the bus operation control circuit BOC notifies the low electric-power consumption control circuit LECC of completion of the purge operation.

While the standby-mode bit bit2 remains set, the bus operation control circuit BOC does not accept any bus operation other than the bus operation on the purge made by the purge-request bit bit3.

The low electric-power consumption control circuit LECC is further provided with a self-refresh-request bit bit4, a DRAM-and-cache clock-mask-request bit bit5 and a standby-request bit bit6. According to the logics of these bits, the self-refresh request D2, the cache clock mask signal CMS2, the DRAM clock mask signal CMS3 and the standby request D3 are outputted.

Figure 5:
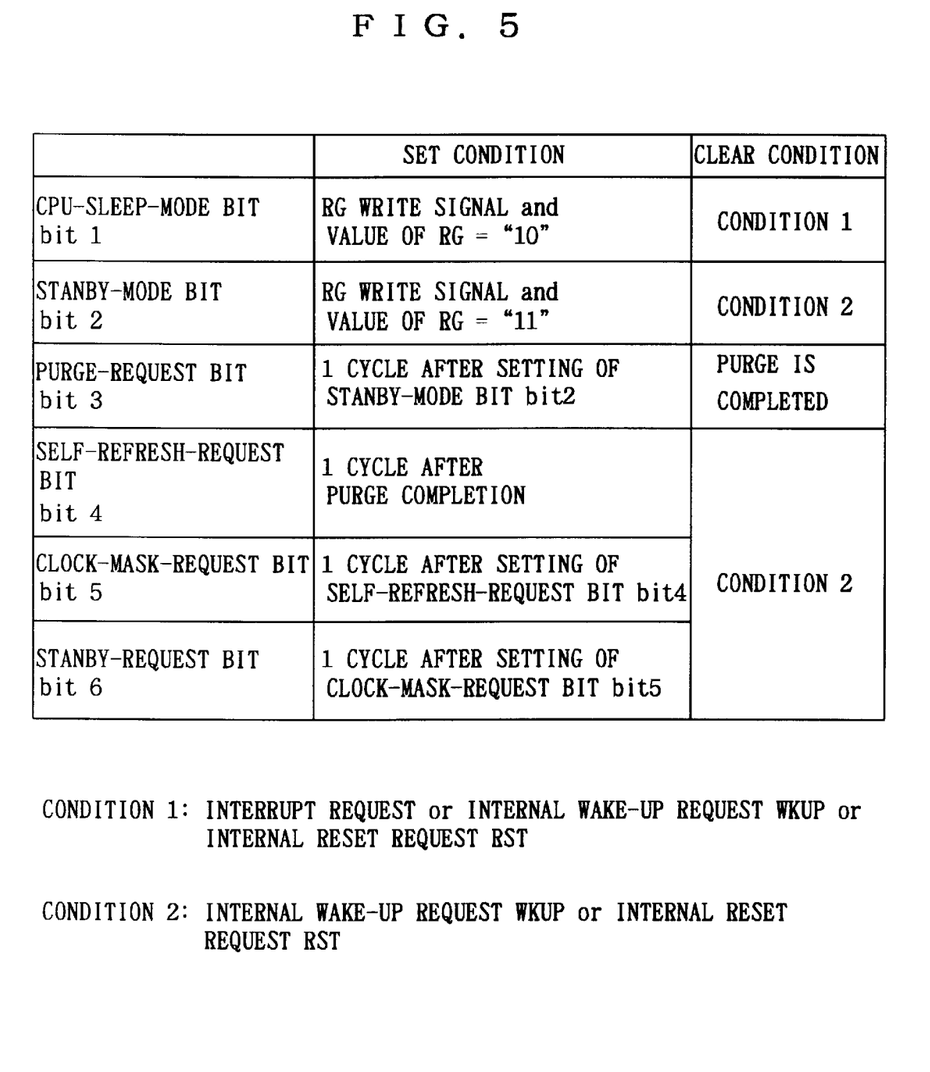
FIG. 5 shows exemplary conditions on functions of the memory controller of FIG. 4.

FIG. 5 shows a set condition and a clear condition of the bits bit1 to bit6. The set condition refers to a condition to set "1" to any given bit and the clear condition refers to a condition to set "0". According to the conditions of FIG. 5, the logics of the respective bits bit1 to bit6 are determined by the circuits in the low electric-power consumption control circuit LECC.

In this figure, "and" indicates that the logical value of the bit is set when both of the conditions are satisfied and "or" indicates that the logical value of the bit is cleared when either of the conditions is satisfied. Furthermore, "cycle" means one cycle of the clock signal.

The MC operation circuit 5a of FIG. 4 which includes the bus operation control circuit BOC and the low electric-power consumption control circuit LECC having the above functions can be designed by functional description using Verilog-HDL and the like.

In the microcontroller of the present invention, the simple operation, i.e., writing a logical value into the low electric-power consumption control register RG, saves electric power to be consumed. If the chip T integrating the CPU 1 and the DRAM 2 is used as a memory, it is only needed to put the circuit into the CPU-sleep mode so as to suspend the CPU 1 which need not work.

Further, even if the clock generation is completely stopped in the standby-mode when the circuit on the chip T need not work, the content of the DRAM 2 is preserved. The memory controller 5 automatically performs the needed operation according to the value stored in the low electric-power consumption control register RG.

This configuration of the present invention remarkably lightens the burden of the user who uses the microcontroller of the present invention, as compared with that of the background art.

While the invention has been shown and described in detail, the foregoing description is n all aspects illustrative and not restrictive. It is therefore understood that numerous modifications and variations can be devised without departing from the scope of the invention.

We claim:

1. An integrated circuit device, comprising:
   a synchronizing signal generation circuit which stops generation of a synchronizing signal when given a standby request;
   a processing circuit for executing an instruction while receiving said synchronizing signal;
   a memory circuit which performs an operation while receiving said synchronizing signal and preserves its content therein independently when given a self-control request; and
   a control circuit for performing a sequential supply of said self-control request and said standby request when a write signal having a value of a first logic is given by said processing circuit.

2. The integrated circuit device of claim 1, further comprising:
   a register for storing said write signal.

3. The integrated circuit device of claim 1, further comprising a cache,
   wherein said control circuit conducts a purge of said cache before said sequential supply of said self-control request and said standby request when said write signal having said value of said first logic is given by said processing circuit.

4. The integrated circuit device of claim 3, wherein
   said control circuit shuts out any interrupt request to be given thereto in said purge and said sequential supply.

5. The integrated circuit device of claim 1, wherein
   said control circuit selectively cuts off said synchronizing signal to be inputted to said processing circuit by generating an enable signal with a logic indicating "non-permission" when said write signal having a value of a second logic is given by said processing circuit.

6. An integrated circuit device, comprising:
   a synchronizing signal generation circuit which stops generation of a synchronizing signal when given a standby request;
   a processing circuit for executing an instruction while receiving said synchronizing signal;
   a memory circuit which performs an operation while receiving said synchronizing signal and preserves its content therein when given a self-control request; and
   a control circuit for performing a sequential supply of said self-control request and said standby request when a write signal having a value of a first logic is given by said processing circuit.

7. The integrated circuit device of claim 6, further comprising:
   a register for storing said write signal.

8. The integrated circuit device of claim 6, further comprising a cache,
   wherein said control circuit conducts a purge of said cache before said sequential supply of said self-control request and said standby request when said write signal having said value of said first logic is given by said processing circuit.

9. The integrated circuit device of claim 8, wherein
   said control circuit shuts out any interrupt request to be given thereto in said purge and said sequential supply.

10. The integrated circuit device of claim 6, wherein
    said control circuit selectively cuts off said synchronizing signal to be inputted to said processing circuit by generating an enable signal with a logic indicating "non-permission" when said write signal having a value of a second logic is given by said processing circuit.

* * * * *